T. F. BOWKER.
TRUSS FOR BICYCLE OR MOTOR CYCLE FRAMES.
APPLICATION FILED MAR. 30, 1915.
1,221,823.
Patented Apr. 10, 1917.
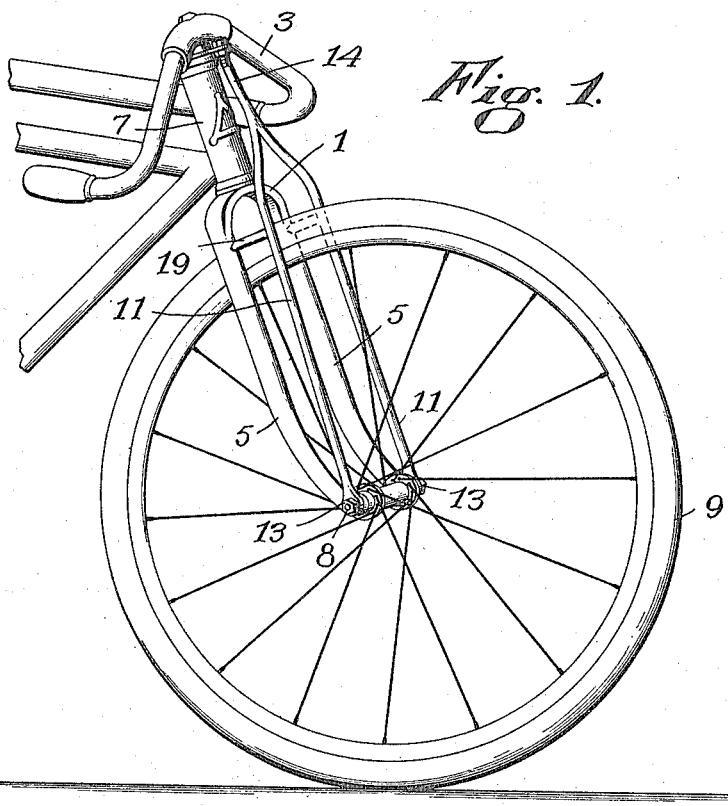
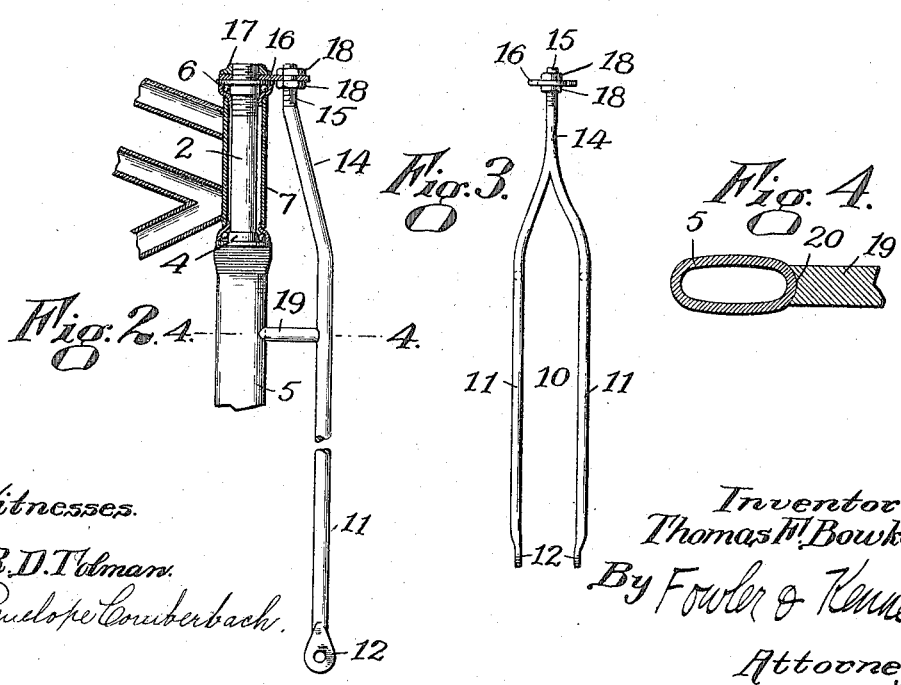
Witnesses.
R. D. Tolman.
Penelope Cumberbach.
Inventor
Thomas F. Bowker.
By Fowler & Kennedy
Attorneys.

UNITED STATES PATENT OFFICE.

THOMAS F. BOWKER, OF FITCHBURG, MASSACHUSETTS, ASSIGNOR TO MARY ELIZABETH JOHNSON, TRUSTEE.

TRUSS FOR BICYCLE OR MOTOR-CYCLE FRAMES.

1,221,823.     Specification of Letters Patent.     Patented Apr. 10, 1917.

Application filed March 30, 1915. Serial No. 18,164.

*To all whom it may concern:*

Be it known that I, THOMAS F. BOWKER, a citizen of the United States, residing at Fitchburg, in the county of Worcester and Commonwealth of Massachusetts, have invented a new and useful Improvement in Trusses for Bicycle or Motor-Cycle Frames, of which the following, together with the accompanying drawings, is a specification.

The present invention relates to trusses for bicycle or motorcycle frames, and has particular reference to a device of this character adapted to impart strength and rigidity to the front forks of such frames, and constructed so as to be readily attached and detached therefrom, when desired.

The features of the invention are fully set forth in the following description and pointed out in the annexed claims, reference being had to the accompanying drawings, in which—

Figure 1 is a perspective view of a portion of a bicycle or motorcycle, having my invention applied thereto.

Fig. 2 is a fragmentary sectional view showing the details of the preferred means for attaching the truss.

Fig. 3 is a front view of the truss, and

Fig. 4 is an enlarged sectional detail view, from the plane of line 4—4, Fig. 2.

Similar reference characters refer to similar parts in the different figures.

In Figs. 1 and 2 I have shown portions of a bicycle or motorcycle frame of usual construction in their relation to a front fork 1 which terminates at its upper end in a tubular section 2, for the reception of the post, or stem of a handle bar 3. The tubular section 2 affords a ball bearing support 4 just above the juncture of the two side members 5, 5 of the fork 1, and a second ball bearing support 6 is preferably adjustably mounted upon the threaded upper end of tubular section 2. The supports 4 and 6 furnish raceways for anti-friction balls, as shown in Fig. 2, contained within suitable sockets at the ends of a sleeve 7 forming part of the bicycle or motorcycle frame, whereby the front fork 1 is given a journal bearing in the frame of the machine.

The lower ends of the side members 5, 5 of the fork are connected by the usual shaft or axle 8 upon which the front wheel 9 is journaled; the present invention contemplates the employment of a reinforcing member 10 extending the entire length of the fork, from the upper end of the tubular section 2 to the lower ends of the side members 5, 5. This member 10 preferably consists of a pair of rods 11, 11, having eyes 12 at their lower ends which fit over the ends of shaft 8 outside of the side members 5, 5 of the fork 1, and are held thereon by nuts 13, 13. Said rods 11, 11 converge upwardly into a short inclined rod 14, preferably integral therewith, having its upper end screw threaded, as shown at 15.

Fitted over the upper end of the tubular section 2, and resting upon the adjustable ball bearing support 6, is an arm 16, said arm being held rigidly in place by an annular nut 17, screw threaded upon the section 2. The arm 16 projects forwardly of the section 2, and its free end is apertured for the passage of the upper threaded end of the rod 14. Rod 14 carries nuts 18, 18, one above and one below the arm 16, which provide a rigid connection between said rod and said arm.

Each rod 11 carries an inwardly projecting stud 19, substantially at right angles thereto, which is preferably made concave at its free end, as shown at 20, to fit the curved surface of the corresponding fork member 5. Said studs serve to brace the central portion of the fork 1; it is clear that the provision of the reinforcing device 10, in the form shown, provides a truss member which will effectually resist any tendency to strain the front fork 1, due to the load which the latter must bear. The truss is readily applied to the fork, and may be removed, when desired, by loosening the nut 17 and removing the upper nut 18 and the side nuts 13.

I claim,

A truss adapted for detachable connection with the front fork of a bicycle comprising members having means for attachment to the front axle, means connected to the upper part of the truss for detachable connection with the upper part of the fork, and struts connected with the intermediate part of the truss member each having a free end formed to firmly engage a member of the front fork.

Dated this 26th day of March 1915.

THOMAS F. BOWKER.

Witnesses:
ERNEST AKER,
FRED A. YOUNG.

Copies of this patent may be obtained for five cents each, by addressing the "Commissioner of Patents, Washington, D. C."